US012010473B2

(12) United States Patent
Olaleye

(10) Patent No.: US 12,010,473 B2
(45) **Date of Patent: *Jun. 11, 2024**

(54) NOISE ABATEMENT MICROPHONE ATTACHMENT

(71) Applicant: Oluseyi Olaleye, National City, CA (US)

(72) Inventor: Oluseyi Olaleye, National City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,826

(22) Filed: Oct. 22, 2021

(65) Prior Publication Data

US 2023/0127981 A1 Apr. 27, 2023

(51) Int. Cl.

*H04R 1/08* (2006.01)
*H04R 9/08* (2006.01)
*H04R 17/02* (2006.01)

(52) U.S. Cl.

CPC ......... *H04R 1/083* (2013.01); *H04R 2410/03* (2013.01)

(58) Field of Classification Search

CPC . H04R 1/08; H04R 9/08; H04R 11/04; H04R 17/02; H04R 21/02
USPC .................................................. 381/355, 369
See application file for complete search history.

(56) References Cited

U.S. PATENT DOCUMENTS 3,862,377 A * 1/1975 Burroughs ............... H04R 1/08 381/361
5,703,957 A * 12/1997 McAteer .................. H04R 1/38 381/361
5,905,803 A * 5/1999 Dou ....................... H04R 1/083 381/355
6,108,432 A * 8/2000 Watanabe ................ G10K 9/22 381/355
7,130,431 B2 * 10/2006 Watson .................... H04R 1/08 381/357
2002/0172388 A1 * 11/2002 Sekiguchi ............. H04R 19/04 381/369
2014/0376761 A1 * 12/2014 Godfrey ................. H04R 1/086 381/355

* cited by examiner

*Primary Examiner* — Suhan Ni

(57) ABSTRACT

The present invention discloses an advance attachment for noise abatement microphone. The assembly proposes a square shaped cavity to receive the microphone assembly where the outer shape is curved. The novel feature of assembly lies in its ease of use, portability and is universal in nature.

3 Claims, 4 Drawing Sheets

NOISE ABATEMENT MICROPHONE ATTACHMENT

BACKGROUND

Field of the Invention

This invention relates to improved microphone attachment for use in conjunction with microphones. Specifically, the microphone attachment is designed to facilitate to reduce background noise and relates to mitigating unwanted noise picked up by a microphone, for example, when recording a performance or recording messages.

Description of the Related Art

The increasing sophistication of music recording devices has made home recording prevalent among musicians. Complex and technologically advanced equipment has become more affordable and thus, more accessible to professional and non-professional musicians. However, a musical recording can only be as good as the recording environment permits. This environment includes the placement and stability of the equipment, as well as the comfort of the surroundings.

A microphone is the key element in a recording environment. It is critical that it be positioned in front of the performer's mouth or instrument to optimize the microphone's available frequency range. In the environment of use of a microphone, there is often substantial physical activity of the performer. The vibrations from such movements, or of the sounds themselves, may cause a distorted sound or background voices.

Currently available microphone attachments used to record performance in an unprocessed space for sound recording, a sound not related to the performance can be picked up by the microphone. Ambient noise or "room tone" may include noise that occurs in space, such as the sound of an air conditioner or computer fan in a room. Noises that enter the space from the outside, such as traffic noise, can also contribute to the ambient noise level. The ambient noise picked up by the microphone during recording of the performance may impair the quality of the recording.

Because of these issues, performance is often recorded in a room that is specifically processed for sound recording. For example, the interior surfaces of the room may be treated with sound absorbing materials to reduce the reflection of the performance sound in the room. The windows and doors of the room may be constructed or reinforced with materials designed to reduce the penetration of external noise into the space. Additional measures may be taken to reduce machine noise in the room. These measures can make processing a room for sound recording a costly and complex attempt. In addition, when the sound recording occurs in the house, it may not be desirable to change the appearance of the room as needed to accommodate the sound recording.

By looking at prior art multiple types of advancements have been seen in similar regards. For instance, a Noise mitigating microphone attachment bearing U.S. Pat. No. 9,118,989 is issued to Kaotica Ip Corp. The patent relates to methods, systems and apparatus are described for mitigating noise during sound recording. A noise mitigating microphone attachment comprises a foam structure. A first cavity extending from a first opening at a surface of the foam structure and into the foam structure. A microphone is inserted into the first cavity with sound receiving elements of the microphone fully installed in the structure. A second cavity extending from a second opening at the surface of the foam structure and into the foam structure is configured to receive sound from a sound source. The first cavity is fluidly connected to the second cavity within the foam structure so that a junction is formed between the first cavity and the second cavity. The junction, the sound cavity, and the sealing of the microphone work to shield the sound receiving elements of the microphone from sound other than received through the second opening.

Another patent on Electroacoustic devices with noise-reducing capability bearing U.S. Pat. No. 7,466,838 is issued to William T. Moseley. The patent relates to new and improved electroacoustic devices each including at least one transducer assembly having one or more microphones typically mounted on a baffle plate and disposed in substantially the same acoustic plane as a speaker or speakers. In the various embodiments, at least one microphone and at least one speaker face the same or opposite directions. Each microphone may be parallel to or oriented at an angle with respect to the speaker. In other embodiments, the speaker includes a central opening or cavity in which a microphone having one of various orientations is provided. The orientations of the microphone or microphones with respect to the speaker or speakers minimize adverse noise reduction effects associated with the differences in sensitivities, frequency responses and phase responses and acoustic time delays between the microphones and the speaker or speakers, as well as minimize sound reflections that are picked up by the microphone or microphones.

A Noise cancellation system with lower rate emulation bearing U.S. Pat. No. 10,431,198 is issued to Cirrus Logic Inc. The patent relates to a noise cancellation system, comprising: an input for a digital signal, the digital signal having a first sample rate; a digital filter, connected to the input to receive the digital signal; a decimator, connected to the input to receive the digital signal and to generate a decimated signal at a second sample rate lower than the first sample rate; and a processor. The processor comprises: an emulation of the digital filter, connected to receive the decimated signal and to generate an emulated filter output; and a control circuit, for generating a control signal on the basis of the emulated filter output. The control signal is applied to the digital filter to control a filter characteristic thereof.

Another U.S. Pat. No. 5,699,436 for a Hands free noise canceling headset is issued to noise Cancellation Technologies Inc. The patent relates to the area of active noise cancellation headsets, the noisy environment often encountered in the link with communication systems causes lack of intelligibility on the outward communications path. Consequently, another in-wire cancellation channel to enhance the intelligibility is required. This additional processing channel adds to the cost of the headset. The invention uses residual microphones (12) to reproduce the sound that remains in the ear after cancellation so that the controller (13) can make further adjustments through filter (15) and LMS adapter (14) to the anti-noise signal.

There are multiple solutions that have been presented in prior art for assistance of users when using microphones along the stand. But the current invention proposes an advancement which presents an attachment for mitigating noise with a portable microphone.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The objective of the invention relates to methods and apparatus for mitigating noise with a portable microphone attachment.

More specifically, it is the principal object of this invention to provide an attachment for a microphone which reduces background noise while recording.

It is also the objective of the system to provide a button which allows the stability at the desired position, thus avoiding additional requirement for the adjustment of attachment to microphone from time to time.

According to another aspect of the invention, it is also the objective of the invention to provide an assembly which can be arranged into a space-efficient and transportable configuration.

It is also the objective of the invention to provide an attachment which is of durable configuration made of high-quality metal.

According to another aspect of the invention, the assembly is low-cost alternative to reinforced or constructed designs of windows and rooms to reduce the intrusion of exterior noise into the space.

Other aspects, advantages and novel features of the present invention will become apparent from the detailed description of the invention when considered in conjunction with the accompanying drawings.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
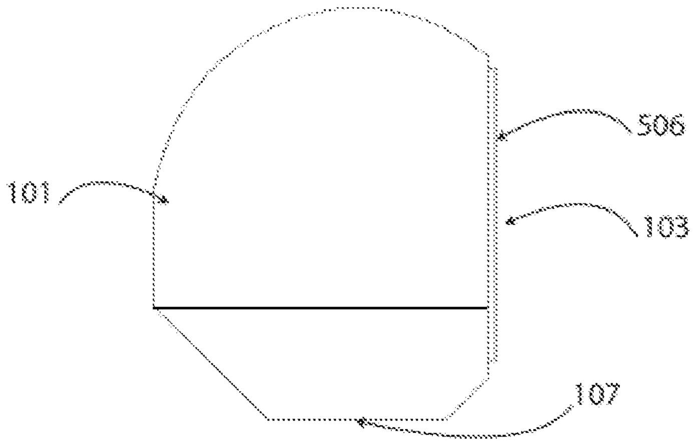
FIG. 1 illustrates left perspective view of proposed assembly, in accordance with an embodiment of the present disclosure.
Figure 2:
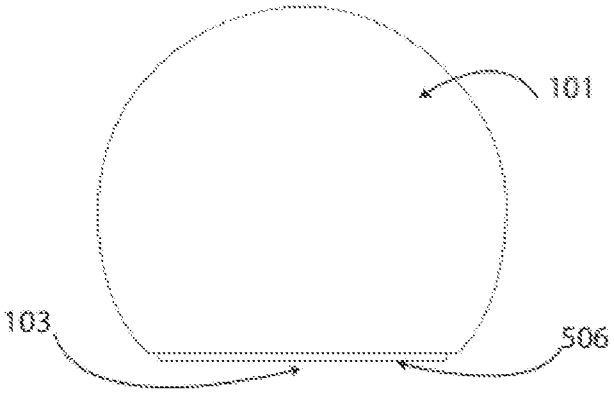
FIG. 2 illustrates complete top view in accordance with an embodiment of the present disclosure.
Figure 3:
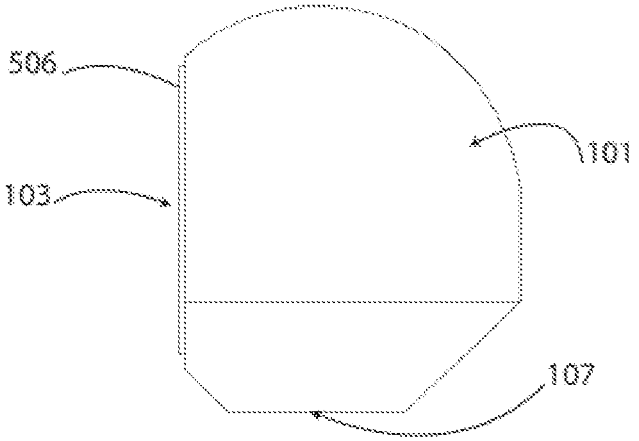
FIG. 3 illustrates right side view, in accordance with an embodiment of the present disclosure.
Figure 4:
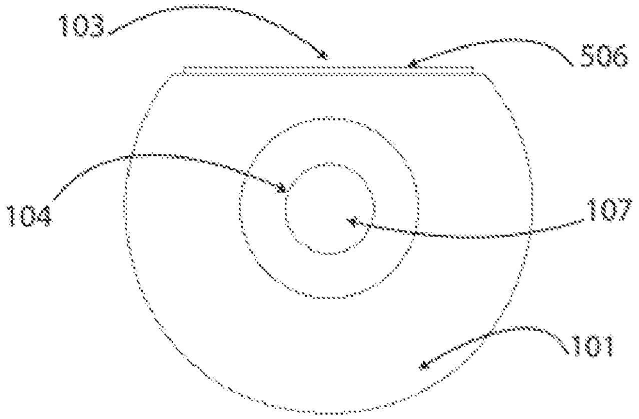
FIG. 4 illustrates bottom side view, in accordance with an embodiment of the present disclosure.
Figure 5:
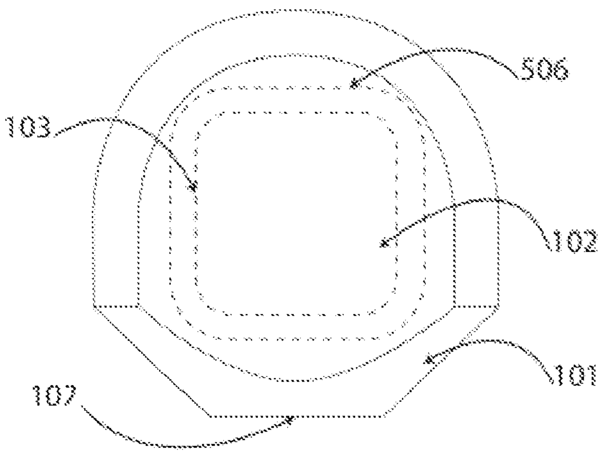
FIG. 5 illustrates front view, in accordance with an embodiment of the present disclosure.
Figure 6:
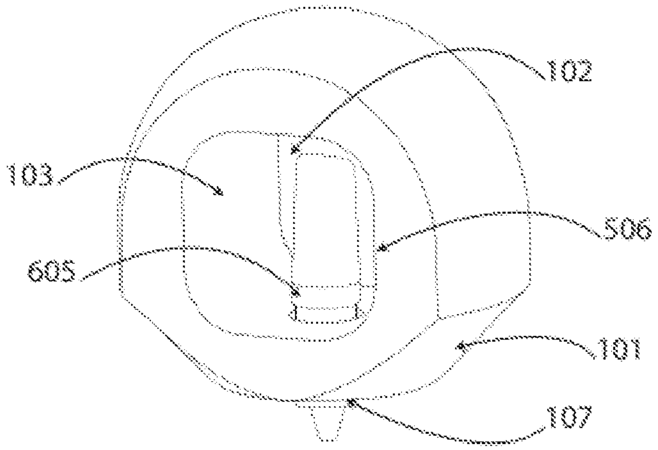
FIG. 6 illustrates perspective view, in accordance with an embodiment of the present disclosure.
Figure 7:
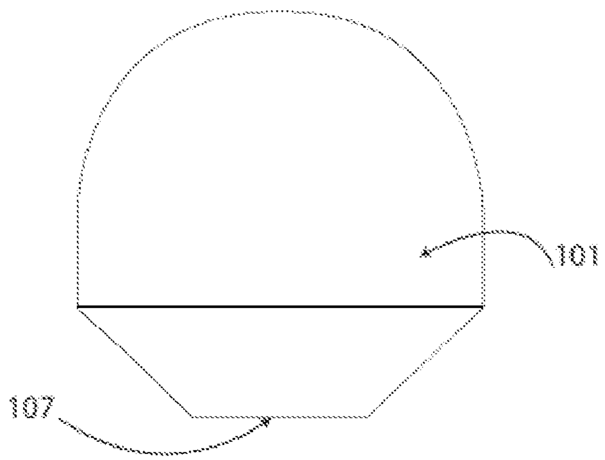
FIG. 7 illustrates back view, in accordance with an embodiment of the present disclosure.
Figure 8:
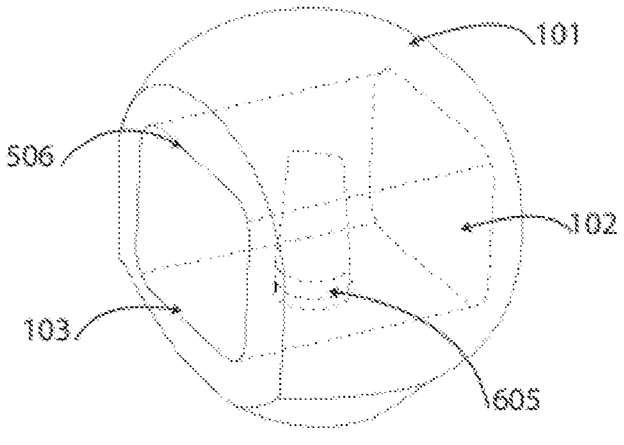
FIG. 8 illustrates inside view, in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present invention is directed to a microphone Noise Abatement Attachment aimed to provide noise free recordings.

Embodiments of the present invention relate to mitigating noise during a capture of sound recording with a noise mitigating microphone attachment. Noise can refer to any unwanted sound, i.e., sound that is not desirable to have a microphone detect during a recording. For example, it may be desirable that noise such as ambient noise and reflections of sound waves originating from a performance sound source is mitigated. The noise mitigating microphone attachment can reduce the amount of noise that a microphone will pick up during a sound recording.

The assembly 101 is comprised of a material such as foam which is curved in shape from outside with an hollow inner cavity 102 along with opening 103. The hollow inner cavity 102 and opening 103 are square shaped and allow microphone 605 to be placed into cavity 104 in the bottom of the assembly 101 which reduces the background noise while recording. A pop filter 506 may be attached to opening 103 to further reduce unwanted noise.

In some embodiments, a microphone coupled to a mobile device is used with the noise mitigating microphone attachment. Where the term "microphone" is used herein, a mobile device or other device having a microphone attachment may be used. For example, a mobile device can extend through the microphone cavity such that a microphone connected to the mobile device extends into the sound cavity.

The portable assembly as per its further embodiments is developed from high quality material which aims to maintain its effectiveness over longer period of time.

The embodiments described herein provide a portable device that can be produced at low-cost relative to the cost of existing solutions for noise Abatement in recording environments. The noise Abatement microphone attachment can be used for sound recording in a home studio, outdoors, or other environment to protect a microphone from picking up unwanted sounds during a performance. A microphone 605 can be inserted into a first opening 107 of the Abatement microphone attachment and extend through a microphone cavity 104 into the hollow inner cavity 102. The hollow inner cavity 102 can extend from a second opening 103 at the surface of the noise mitigating microphone attachment. A performance sound source is typically located proximate to the second opening 103. Sound incident on the exterior of the noise mitigating microphone attachment is attenuated by the structure of the noise Abatement microphone attachment.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A portable Noise Abatement Microphone Attachment comprising:
- a semi-spherical top half;
- a conical bottom half;
- a flat front face;
- wherein the portable Noise Abatement Microphone Attachment has an opening for a hollow inner cavity within said front face;
- wherein said opening is a square shape; and
- wherein said square shape is maintained throughout a depth of said hollow inner cavity.

2. The portable noise abatement microphone attachment of claim 1 further comprising:
- a bottom cavity located within the conical bottom half; and
- wherein said bottom cavity allows a microphone to be installed facing the opening.

3. The portable noise abatement microphone attachment of claim 2 wherein the microphone is inserted through the bottom cavity towards the square shaped opening.

* * * * *